(12) United States Patent
Rao et al.

(10) Patent No.: US 7,614,060 B2
(45) Date of Patent: Nov. 3, 2009

(54) UNIFIED CONCEPT OF PRESENCE

(75) Inventors: Ravi T. Rao, Redmond, WA (US); Sandeep Kishan Singhal, Kirkland, WA (US); Todd R. Manion, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/413,565

(22) Filed: Apr. 28, 2006

(65) Prior Publication Data

US 2007/0255577 A1 Nov. 1, 2007

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/320

(58) Field of Classification Search .................. 719/320
See application file for complete search history.

(56) References Cited

U.S. PATENT DOCUMENTS

| | | | |
|---|---|---|---|
| 5,649,105 A | 7/1997 | Aldred et al. | |
| 6,658,095 B1 * | 12/2003 | Yoakum et al. | 379/93.01 |
| 6,697,840 B1 * | 2/2004 | Godefroid et al. | 709/205 |
| 7,283,805 B2 * | 10/2007 | Agrawal | 455/412.2 |
| 7,305,437 B2 * | 12/2007 | Horvitz et al. | 709/204 |
| 7,551,925 B2 * | 6/2009 | Simongini et al. | 455/433 |
| 7,555,108 B2 * | 6/2009 | Sylvain | 379/207.02 |
| 2002/0083127 A1 * | 6/2002 | Agrawal | 709/203 |
| 2003/0217142 A1 * | 11/2003 | Bobde et al. | 709/224 |
| 2004/0003042 A1 | 1/2004 | Horvitz et al. | |
| 2004/0122901 A1 * | 6/2004 | Sylvain | 709/206 |
| 2004/0148347 A1 | 7/2004 | Appelman et al. | |
| 2004/0199663 A1 * | 10/2004 | Horvitz et al. | 709/238 |
| 2005/0068167 A1 * | 3/2005 | Boyer et al. | 340/531 |
| 2005/0091435 A1 | 4/2005 | Han et al. | |
| 2005/0154698 A1 * | 7/2005 | Ikezawa et al. | 707/1 |
| 2005/0170847 A1 * | 8/2005 | Karlsson et al. | 455/456.2 |
| 2005/0197995 A1 * | 9/2005 | Badt et al. | 707/1 |
| 2005/0262195 A1 * | 11/2005 | Ono et al. | 709/203 |
| 2006/0047761 A1 * | 3/2006 | Kaplan et al. | 709/206 |
| 2006/0075091 A1 * | 4/2006 | Beyda et al. | 709/224 |

(Continued)

OTHER PUBLICATIONS

Godefroid, P., Herbsleb, J. D., Jagadeesany, L. J., and Li, D., "Ensuring privacy in presence awareness: an automated verification approach", 2000, ACM Press, Proceedings of the 2000 ACM Conference on Computer Supported Cooperative Work, CSCW '00, pp. 59-68.*

(Continued)

*Primary Examiner*—Hyung S Sough
*Assistant Examiner*—KimbleAnn Verdi
(74) *Attorney, Agent, or Firm*—Marshall, Gerstein & Borun LLP (57) ABSTRACT

A method and system may provide a unified concept of presence across all connected hosts by providing a common point of access for all presence-related data on the system. The application abstraction layer may provide a common interface for all presence-enabled applications to access and publish information related to locally or remotely-executing presence applications. The application abstraction layer may push presence data to the presence-enabled applications, or each application may access the layer to gain presence data related to other applications. Also, the application abstraction layer may store all presence data locally or remotely.

18 Claims, 4 Drawing Sheets

U.S. PATENT DOCUMENTS

| | | | |
|---|---|---|---|
| 2006/0167998 A1* | 7/2006 | Yoshiuchi et al. | 709/204 |
| 2006/0224688 A1* | 10/2006 | Morris | 709/217 |
| 2006/0248185 A1* | 11/2006 | Morris | 709/224 |
| 2007/0032194 A1* | 2/2007 | Griffin | 455/41.2 |
| 2007/0069888 A1* | 3/2007 | Parameswar | 340/539.13 |
| 2007/0118616 A1* | 5/2007 | Simongini et al. | 709/219 |
| 2007/0143415 A1* | 6/2007 | Daigle | 709/206 |
| 2007/0174886 A1* | 7/2007 | Scheuer et al. | 725/110 |
| 2007/0256083 A1* | 11/2007 | Vayssiere | 719/320 |
| 2008/0040728 A1* | 2/2008 | Agrawal | 719/313 |

OTHER PUBLICATIONS

Hull, R.; Kumar, B.; Lieuwen, D.; Patel-Schneider, P.F.; Sahuguet, A.; Varadarajan, S.; Vyas, A., "Enabling context-aware and privacy-conscious user data sharing," 2004, Proceedings. 2004 IEEE International Conference on Mobile Data Management, pp. 187-198.*

International Search Report for PCT/US2007/010569 mailed Oct. 29, 2007.

Written Opinion for PCT/US2007/010569 mailed Oct. 29, 2007.

* cited by examiner

UNIFIED CONCEPT OF PRESENCE

BACKGROUND

Presence technology allows users to publish their availability for network interaction. Currently, applications only consolidate presence information within a single application instance. For example, instant messaging applications keep track of a user's presence solely as it relates to that application. If the user sets his presence status to "not present" within the instant messaging application, that information will not be shared with any other presence-enabled applications. As more presence-enabled applications allow group interaction and collaboration, a user may desire to selectively publish his overall system presence information or his presence within a particular application instance. Furthermore, applications allowing collaboration among networked users may use application presence information to enable cooperative features.

SUMMARY

On a computing system, a method of unifying presence provides an application abstraction layer on the computing system. The application abstraction layer may provide a common interface for all presence-enabled applications to access and publish information related to locally or remotely-executing presence applications. The application abstraction layer may push presence data to the presence-enabled applications, or each application may access the layer to gain presence data related to other applications. Also, the application abstraction layer may store all presence data locally or remotely.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
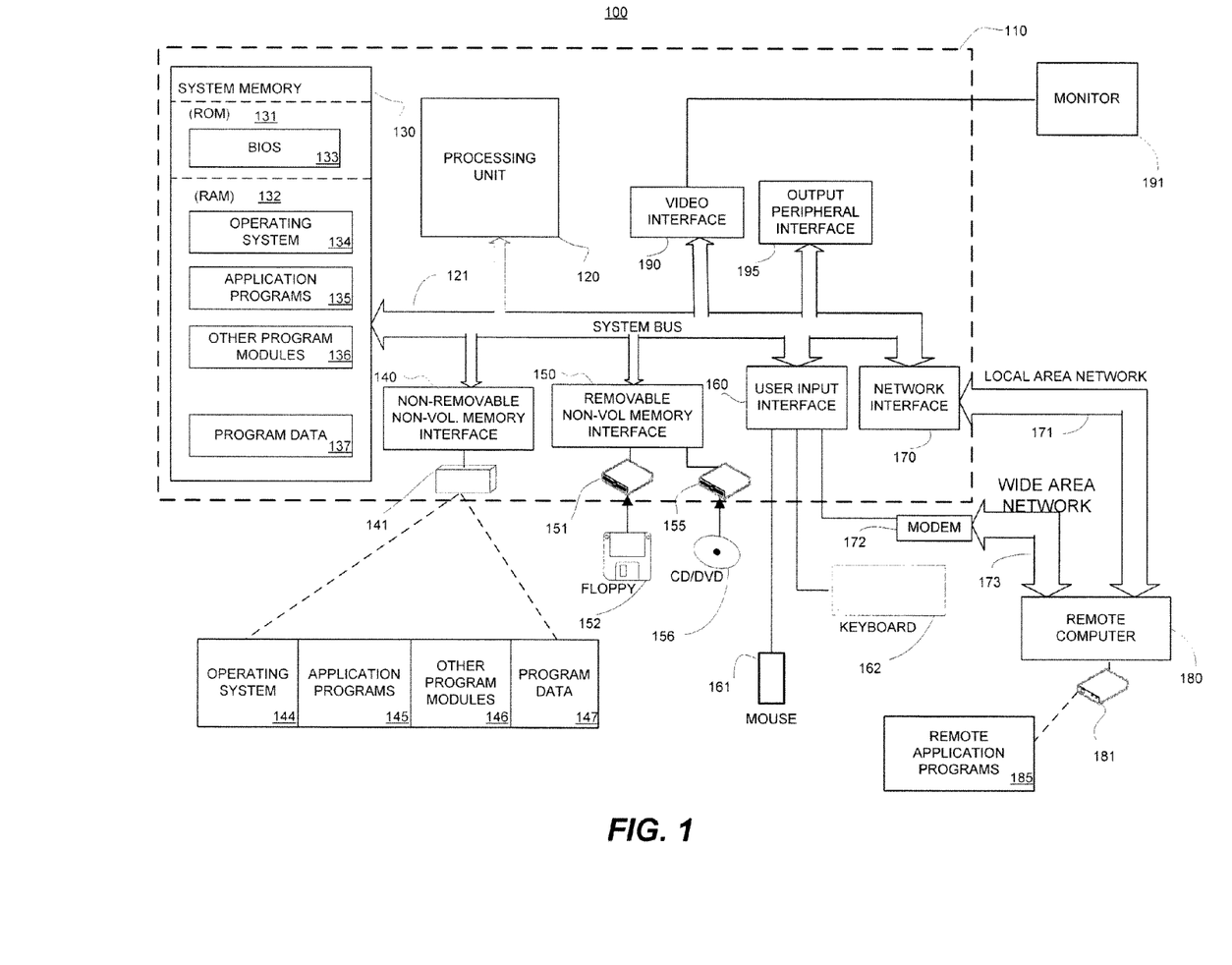
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation of the scope of use or functionality of the claimed method or apparatus. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer or PC 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices which may be connected through an output peripheral interface 195 or via the network interface 170.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A method and apparatus for unifying presence information on a computing system may execute or reside on a computing device 110 or a remote computing device 180 as an application in memory. For example, the method and apparatus may execute or reside in system memory 130 and may include, without limitation, an application in the BIOS 133, operating system 134, application programs 135, other program modules 136, and the program data 137. Additionally, the method and apparatus may execute or reside in non-removable, non-volatile memory 141 and may operate as part of, without limitation, the operating system 144, application programs 145, other program modules 146, or the program data 147. Further, the method and apparatus may execute or reside in removable, non-volatile memory 151, 155 such as a floppy disk 152 or an optical disk 156. The method and apparatus may also relate to remote application programs 185 executing on the remote computer 180. Additionally the method and apparatus may relate to any hardware device, interface, network connection, internal or external connection associated with the computers 110, 180.

Figure 2:
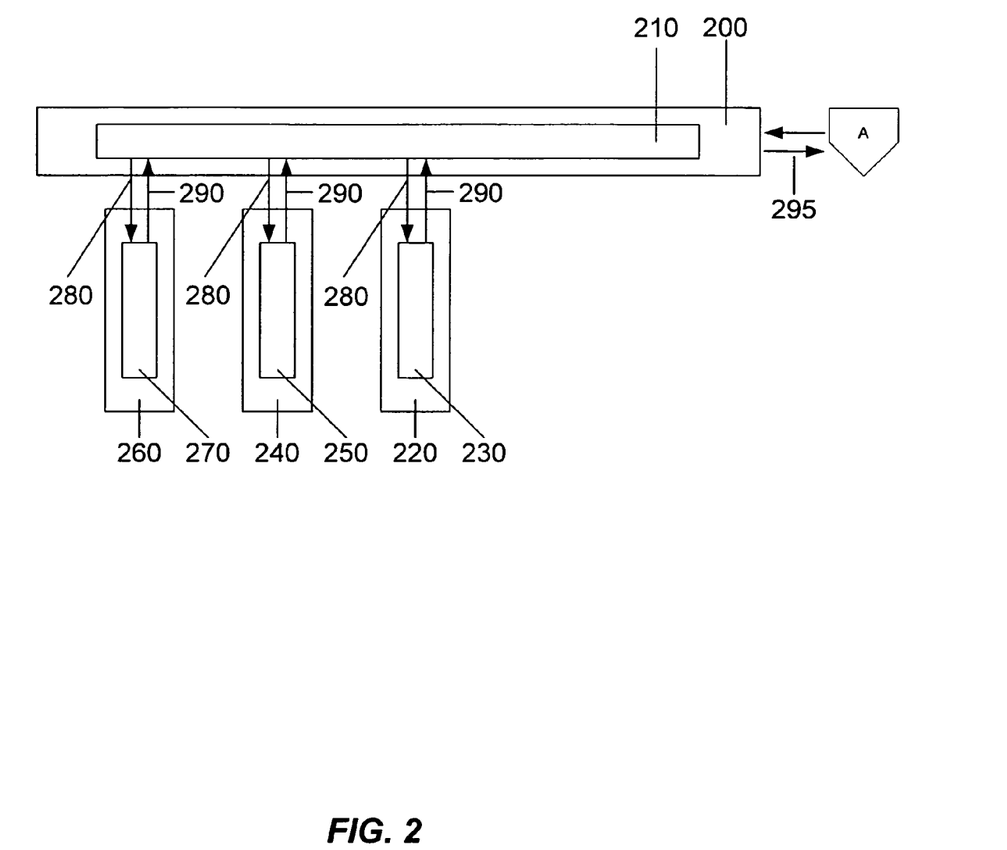
FIG. 2 is a block diagram illustrating an application abstraction layer and presence applications.
Figure 3:
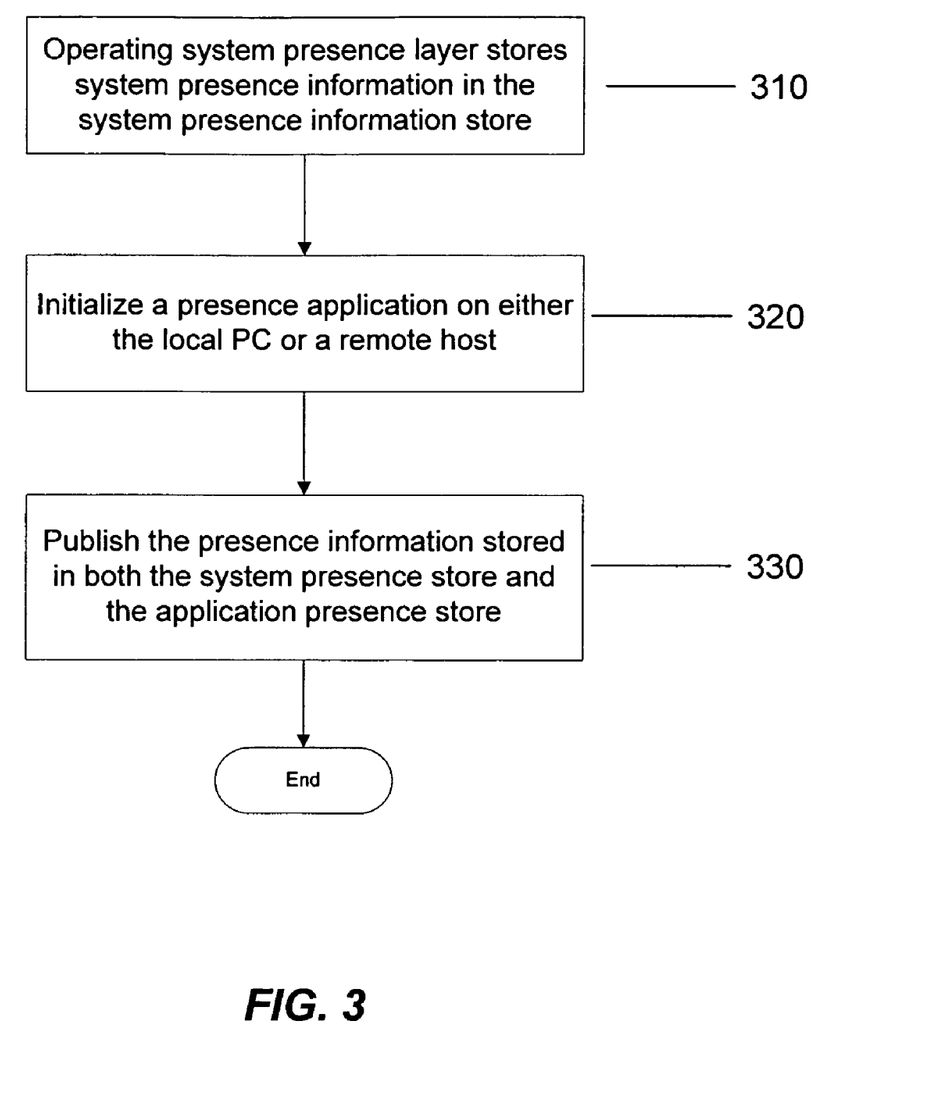
FIG. 3 is a flowchart of the method in accordance with the claims.

With reference to FIGS. 2 and 3, a method and apparatus for unifying presence information on a computing system may be described. At block 310, a PC 110 operating system 134 presence layer 200 may store system presence information within a system presence store 210. The presence layer 200 is an operating system 134 component which acts as an application abstraction layer. As used herein, an operating system component may describe any discrete portion of the operating system 134 that performs a specific system function. Some typical operating system components are process management, memory management, file management, input/output system management, secondary storage management, and the command interpreter system. Further, as used herein, an application abstraction layer may describe a software translation layer that provides a common interface between applications and the operating system 143. The presence layer 200 may contain a system presence store 210 that acts as a repository for all presence information related to the system. For example, if a user sets his system presence to "not present," the presence layer 200 may collect that information in the system presence store 210.

At block 320, a presence application 220 may be initialized either on the local PC 110 or on a remote host 180. The presence application 220 may be a typical instant messaging application, or it may be any application that allows multiple local or remote users to interact or collaborate on a common task. For example, a word processor application may allow multiple users to locally or remotely work on a single document at the same time. The presence application 220 may contain an application presence store 230 that acts as a repository for all presence information related to the user's instance of the presence application 220. For example, a user may set a status on the word processor presence application 220 to "busy" or "not present" to allow a user to work on a document without interruption from other collaborators. In the previous example, the user may simultaneously set the system presence to "present" even though the presence application 220 status may be set to "not present." Therefore, a user may be "present" or "online" on the local host, but not "present" in the context of particular groups associated with a presence application 220. Conversely, a user may set the system presence to "not present" and all presence applications 220, 240, 260 may also register the user as "away."

At block 330, the presence layer 200 may publish the information stored in both the system presence store 210 and the application presence store 230 to any other application presence store 250, 270. Publishing the system and application presence status to all other presence applications 220, 240, 260 may allow a user to selectively interact with any other user. The presence layer 200 may publish the presence information by pushing 280 the system presence status to the presence applications 220, 240, 260 and into the presence application stores 230, 250, 270. Similarly, the presence applications 220, 240, 260 may push 290 the presence application status from the presence application stores 230, 250, 270 to the presence layer 200 and into the presence layer store 210. By publishing the information stored in both the system presence store 210 and the application presence store 230, the PC 110 may have a unified picture of all presence application 220, 240, 260 presence information as well as the system presence information on the presence layer 200.

Figure 4:
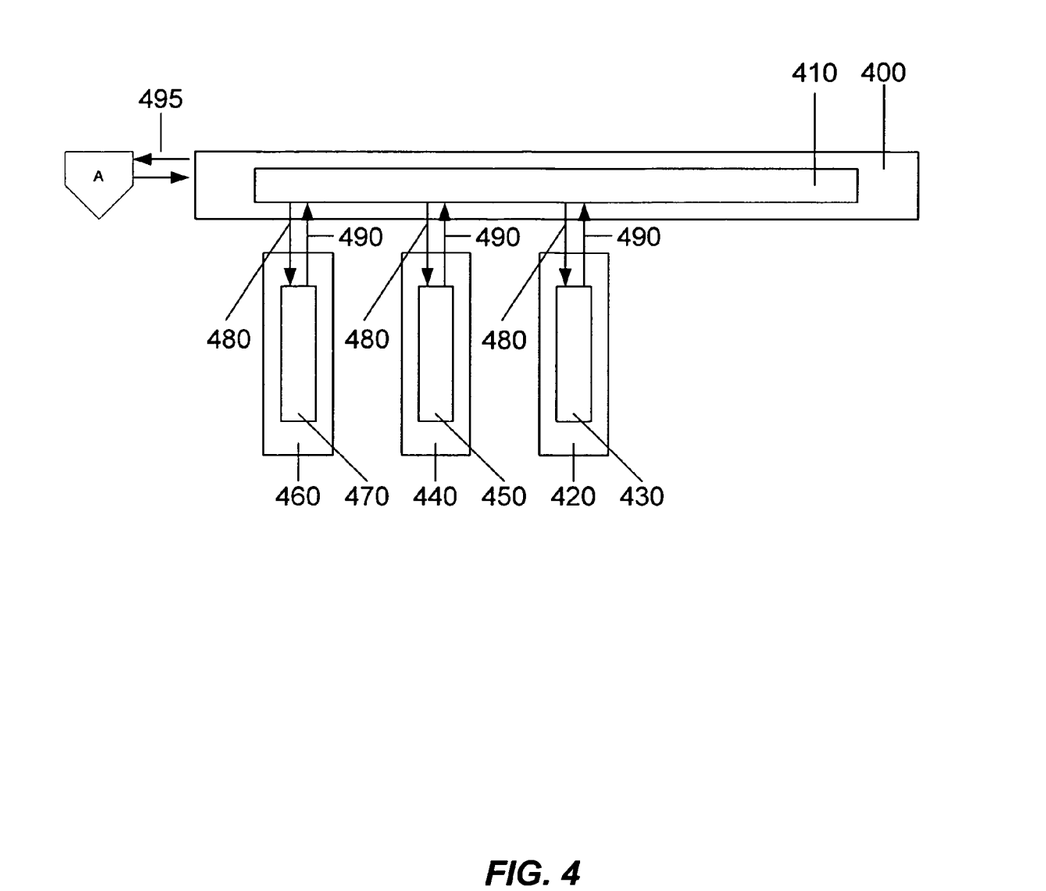
FIG. 4 is a block diagram illustrating an application abstraction layer and presence applications.

With reference to FIGS. 2 and 4, presence information may be shared across systems. The presence layer of each system 200, 400 may be pushed 295, 495 to systems connected through a network. Where each presence layer 200, 400 has a common, presence-enabled application 220, 420, 440, and 460 and proper access rights, both the system presence store 210, 410 and the specific application presence store 230, 430, 450, and 470 may be shared 480, 490 across other systems. Therefore, users may have a common, unified appreciation for the presence of system and application presence in the network across multiple, connected systems.

Presence information may also be shared in accordance with hierarchical access rights. For example, a supervisor may have presence information access rights to see the system and application presence information for all subordinate employees. Any subordinate employee, however, may not have access rights to a supervisor's information. These access rights may be configurable by an organization's authorized administrator according to any combination of parameters such as rank within the organization, job requirements, group or department hierarchy, and job title. Further, the user may configure access rights to the user's presence information for trusted users outside of the hierarchical scheme. For example, a user may give access rights to a friend or a family member. The friend or family member may then see the user's system and application presence information. The user may configure access rights to the user's entire system, or any combination of presence applications.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. On a computing system, a method of unifying presence comprising:

initializing an instance of one or more presence applications on a computer, each presence application instance including an application presence store that is in communication with an application abstraction layer at the computer, the application abstraction layer including a system presence store;

each presence application instance generating application presence data;

storing the generated application presence data for each presence application instance in the application presence store included with the presence application instance that generated the application presence data;

generating system presence data;

storing the generated system presence data in the system presence store; and     publishing, to one or more application presence stores and through the application abstraction layer, both the generated system presence data stored in the system presence store and the application presence data stored in each application presence store;

wherein the application presence data includes presence information describing the availability of each corresponding instance of the one or more presence applications initialized on the computer;

wherein the system presence data includes presence information describing the availability of the computer that initialized the instance of the one or more presence applications; and wherein the application abstraction layer comprises a common interface for each presence application instance to access both the generated system presence data and the generated application presence data.

2. The method of claim 1, further comprising pushing, through the application abstraction layer, one or more of the system presence data and a first portion of the application presence data to a presence application.

3. The method of claim 2, further comprising sharing one or more of the system presence data and the application presence data with one or more hosts on the computing system.

4. The method of claim 1, wherein the one or more of the presence applications is executed on a remote host.

5. The method of claim 1, wherein the system presence data comprises a system presence state, the system presence state comprising information related to a computing system availability.

6. The method of claim 1, wherein the application presence data comprises an application presence state, the application presence state comprising information related to a user's availability within the presence application that was initialized on the user's computer.

7. The method of claim 1, further comprising the application abstraction layer communicating with one or more application presence store, the application presence store comprising application presence data.

8. The method of claim 1, further comprising the system presence store communicating with each application presence store.

9. The method of claim 1, wherein the application abstraction layer comprises an operating system component.

10. On a computing system, a method of unifying presence comprising:

initializing a first instance of a presence application on a first computing system, the first instance of the presence application including a first application presence store for storing first application presence data, the first application presence store in communication with a first application abstraction layer including a first system presence store for storing first system presence data for the first computing system;

initializing a second instance of the presence application on a second computing system, the second instance of the presence application including a second application presence store for storing second application presence data, the second application presence store in communication with a second application abstraction layer including a second system presence store for storing second system presence data for a second computing system;

wherein the first system presence data comprises information describing the first computing system availability and the second system presence data comprises information describing the second computing system availability;

the first instance of the presence application generating the first application presence data;

wherein the first application presence data comprises information describing the availability of the first instance of the presence application and the second application presence data comprises information describing the availability of the second instance of the presence application;

pushing, from the first application abstraction layer through the second application abstraction layer, to the second application presence store, both the first system presence data and the first application presence data;

storing both the pushed first system presence data and the first application presence data in the second application presence store; and wherein the first application abstraction layer and the second application abstraction layer comprise a common interface for accessing the first system presence data and the first application presence data at the second instance of the presence application, and for accessing the second system presence data and the second application presence data at the first instance of the presence application.

11. The method of claim 10, wherein the first application presence data comprises information related to the availability of a first user of the first instance of the presence application and the second application presence data comprises information related to the availability of a second user of the second instance of the presence application.

12. A distributed computer system comprising:

an application abstraction layer including a system presence store that stores system presence data that describes an availability of a first one of a plurality of presence-enabled computers;

one or more presence-enabled applications executing on each of the plurality of presence-enabled computers, each of the one or more presence-enabled applications including an application presence store that stores application presence data that describes the availability of each corresponding one of the one or more presence-enabled applications, wherein each application presence store is in communication with an application abstraction layer at each of the plurality of presence-enabled computers; and a processor configured to:

generate both system presence data for a first presence-enabled computer of the distributed computer system and application presence data for a first presence-enabled application executing on the first presence-enabled computer;

store the generated system presence data in the system presence store of the first presence-enabled computer and the generated application presence data in the application presence store of the first presence-enabled application; and wherein the application abstraction layer publishes, to each application presence store of the one or more presence-enabled applications executing on one or more of the plurality of presence-enabled computers other than the first presence enabled computer, and through the application abstraction layer of the first presence-enabled computer, both the generated system presence data and the generated application presence data to a second one or more of the application presence stores, the application abstraction layer comprises a common interface for each of the one or more presence-enabled applications to access both the generated system presence data and the generated application presence data.

13. The distributed computer system of claim 12, wherein the system presence data describing the availability of the first presence-enabled computer is pushed to the one or more presence-enabled applications.

14. The distributed computer system of claim 13, wherein the one or more presence-enabled applications is executed locally or remotely on the plurality of presence-enabled computers.

15. The distributed computer system of claim 12, wherein the processor is further configured to share the system presence data and application presence data with one or more hosts through the application abstraction layer on each of the presence-enabled computers.

16. The distributed computer system of claim 12, wherein the application abstraction layer pushes the system presence data to the one or more presence-enabled applications.

17. The distributed computer system of claim 12, wherein the application abstraction layer includes a software translation layer providing a common interface between the one or more presence-enabled applications and an operating system of the first one of the plurality of presence-enabled computers.

18. The distributed computer system of claim 12, wherein the application abstraction layer publishes the system presence store and the one or more application presence stores according to hierarchical access rights.

* * * * *

UNITED STATES PATENT AND TRADEMARK OFFICE
CERTIFICATE OF CORRECTION

PATENT NO.       : 7,614,060 B2                                  Page 1 of 1
APPLICATION NO.  : 11/413565
DATED            : November 3, 2009
INVENTOR(S)      : Ravi T. Rao et al.

It is certified that error appears in the above-identified patent and that said Letters Patent is hereby corrected as shown below:

In column 8, line 55, in Claim 12, delete "presence enabled" and insert -- presence-enabled --, therefor.

Signed and Sealed this
Twenty-second Day of February, 2011

David J. Kappos
*Director of the United States Patent and Trademark Office*